United States Patent [19]

Nelson et al.

[11] 4,107,064

[45] Aug. 15, 1978

[54] METAL SEQUESTERING METHOD

[75] Inventors: Gunner E. Nelson; Tillmon H. Pearson, both of Baton Rouge, La.

[73] Assignee: Ethyl Corporation, Richmond, Va.

[21] Appl. No.: 824,401

[22] Filed: Aug. 15, 1977

Related U.S. Application Data

[60] Division of Ser. No. 682,320, May 3, 1976, Pat. No. 4,066,687, which is a division of Ser. No. 385,545, Aug. 3, 1973, Pat. No. 3,980,578, which is a continuation-in-part of Ser. No. 153,816, Jun. 16, 1971, Pat. No. 3,784,486.

[51] Int. Cl.$^2$ .................................................. C11D 1/86
[52] U.S. Cl. ................................. 252/89 R; 252/135; 252/180; 252/544; 252/DIG. 11
[58] Field of Search ................. 252/89 R, 132, 135, 252/180, 544, 546, DIG. 11, 527, 539; 134/42, 13; 260/535 P

[56] References Cited

U.S. PATENT DOCUMENTS

| | | | |
|---|---|---|---|
| 3,692,685 | 9/1972 | Lamberti et al. | 252/89 |
| 3,725,290 | 4/1943 | Nelson et al. | 260/535 P |

*Primary Examiner*—Mayer Weinblatt
*Attorney, Agent, or Firm*—Donald L. Johnson; John F. Sieberth; Paul H. Leonard

[57] ABSTRACT

A method for sequestering metal ions using $\alpha,\alpha'$-carboxyalkoxy succinic acid or salts thereof in combination with a surfactant.

9 Claims, No Drawings

METAL SEQUESTERING METHOD

CROSS-REFERENCE TO RELATED APPLICATIONS

This application is a division of application Ser. No. 682,320, filed May 3, 1976, now U.S. Pat. No. 4,066,687, which is a division of application Ser. No. 385,545, filed Aug. 3, 1973, now U.S. Pat. No. 3,980,578, which in turn is a continuation-in-part of application Ser. No. 153,816, filed June 16, 1971, now U.S. Pat. No. 3,784,486.

BACKGROUND OF THE INVENTION

In the manufacture of detergent formulations for laundering and general purpose washing operations, it is common practice to employ detergent builders — substances used in combination with surface-active compounds to aid in cleansing the articles being washed. The polyphosphates, notably sodium tripolyphosphate and tetrasodium pyrophosphate, are the commonly used detergent builders. However, these materials possess a serious shortcoming. For example, the phosphorus residues resulting from the widespread use of synthetic detergent formulations containing these phosphorus-containing builders have been said to contribute to eutrophication of rivers, lakes, underground streams, and other bodies of water. ["Detergent Phosphorus Effect on Algae" by Thomas E. Maloney, *Journal of the Water Pollution Control Federation*, Vol. 38, No. 1, pp. 38–45 (January 1966)]. To appreciate the magnitude of the problem, it has been estimated that over two billion pounds of salts of condensed phosphates are used in detergents each year in the United States. The phosphorus-containing builders can therefore be properly termed ubiquitous.

Further there is also at present a growing need for low cost sequestering agents efficiently operable over wide pH ranges (7–10). The use of sequestering agents to remove metal ions or to reduce metal ion concentrations is well known to the scientific community. For example, sequestering agents are used in metal cleaning processes, leather tanning, textile processes, the stabilization of dyes and vegetables oils, laundering and other washing operations, and the processing of beer. Most of the sequestering agents used today are efficient only at a high pH (9–10). In addition some of the best known sequestering agents such as sodium tri-polyphosphate suffer from the eutrophication problems discussed above.

Thus, there is a need for a compound which is an effective non-phosphorus detergent builder and is also an effective sequestrant over a wide pH range. Accordingly, it is an object of this invention to provide a detergent builder system which is devoid of the eutrophic characteristics exhibited by the polyphosphates and other phosphorus builders. Further, it is an object of this invention to provide washing compositions which are devoid of phosphorus-containing builders but which possess the advantageous characteristics of washing compositions which presently contain the polyphosphate builders. Another object of this invention is to provide a sequestering agent which is effective over a wide pH range.

Other important objects of this invention will become apparent from the ensuing description and appended claims.

THE INVENTION

One embodiment of this invention involves the provision of α,α'-carboxyalkoxy succinic acid and the water-soluble salts thereof. As will be apparent from the ensuing description, these new compounds are of considerable utility in the chemical and allied arts. By way of example, the compounds of this invention in which the carboxyalkoxy radicals contain from 2 to about 7 carbon atoms are especially useful as sequestrants and as detergent builders. The compounds of this invention in which the carboxyalkoxy radicals contain from about 8 to about 30 carbon atoms are of utility as lubricant additives, sizing agents for paper and textiles, and the like. The preferred compounds for treating cellulose, such as sizing paper and fabrics or fibers and for use as dispersants and detergents in lubricating oil for gasoline and diesel engines generally contain from about 10 to about 20 carbon atoms in each carboxyalkoxy radical.

Thus another embodiment of this invention provides an aqueous solution which contains a sequestrant selected from the group consisting of: (a) α,α'-carboxyalkoxy succinic acid, wherein the carboxyalkoxy radicals contain from 2 to about 7 carbon atoms, (b) water soluble salts of said acids; and (c) mixtures of (a) and (b).

A further embodiment involves the method of sequestering sequesterable metal ions in an aqueous solution which comprises introducing into said solution a sequestrant composition selected from the group consisting of: (a) α,α'-carboxyalkoxy succinic acid, wherein the carboxyalkoxy radicals contain from 2 to about 7 carbon atoms, (b) water soluble salts of said acids; and, (c) mixtures of (a) and (b). In this method it is desirable to also introduce into the solution a surfactant selected from the group consisting of anionic detergents, cationic detergents, nonionic detergents, ampholytic detergents, zwitterionic detergents and mixtures thereof, the ratio by weight of the surfactant to the sequestrant being from about 10:1 to about 1:10.

In accordance with another facet of this invention, it has been found possible to reduce —, indeed, eliminate — the phosphorus-containing builders in detergent formulations without sacrifice of cleaning power and brightness by employing a detergent builder selected from the group consisting of:

(a) α,α'-carboxyalkoxy succinic acids wherein the carboxyalkoxy radicals contain from 2 to about 7 carbon atoms;
(b) water soluble salts of said acids; and
(c) mixtures of (a) and (b).

Generally, the acids of this invention which may be used as sequestrants or builders have the formula:

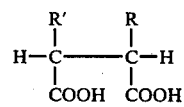

wherein R is a carboxyalkoxy radical having from 2 to about 7 carbon atoms and wherein R' is a carboxyalkoxy radical having from 2 to about 7 carbon atoms. Examples of various, α,α'-carboxyalkoxy succinic acids which are effective as builders are: α,α'-(1-carboxyethoxy) succinic acid, α,α'-carboxyisobutoxy succinic acid, α,α'-(1-carboxypentoxy) succinic acid, α-(2-methyl-3-carboxybutoxy)-α'-carboxymethoxy succinic acid, $\alpha,\alpha'$-(1-carboxyhexoxy) succinic acid, $\alpha$-carboxyisobutoxy-$\alpha'$-(1-carboxyethoxy) succinic acid and the like. The most preferred acid has been found to be $\alpha,\alpha'$-carboxymethoxy succinic acid.

As before mentioned water soluble salts of the $\alpha,\alpha'$-carboxyalkoxy succinic acids of this invention are also useful sequestrants and detergent builders. The preferred salts are the mono, di, tri, and tetra alkali metal salts of such acids due to their relative inexpensiveness and stability. Examples of such useful salts are $\alpha,\alpha'$-carboxymethoxy succinic acid, monosodium salt; $\alpha,\alpha'$-carboxymethoxy succinic acid, tetrasodium salt; $\alpha,\alpha'$-(1-carboxyethoxy) succinic acid, monosodium salt; $\alpha,\alpha'$-carboxymethoxy succinic acid, tetrapotassium salt; $\alpha,\alpha'$-(1-carboxyethoxy) succinic acid, dipotassium salt; $\alpha$-(1-carboxymethoxy)-$\alpha'$-(1-carboxyethoxy) succinic acid, trirubidium salt; $\alpha,\alpha'$-carboxyisobutoxy succinic acid, dilithium salt; $\alpha,\alpha'$-(1-carboxyhexoxy) succinic acid, monocesium salt, and the like. Normally the sodium or potassium salts will be found most useful. However, other salts may be found suitable such as the ammonium salts, alkylammonium salts, or the like. The alkaline earth metal salts, particularly the calcium salts, are useful intermediates in certain processes for producing the alkali metal salts or the acids.

The builders of this invention can be advantageously used with a wide variety of detergent actives or surfactants, including those known in the art as anionic, cationic, nonionic, ampholytic, and zwitterionic detergents as well as any suitable mixture of such detergents. When the resultant washing compositions are used in aqueous washing systems, the cleaning power of the formulation is enhanced in much the same way as when the commonly used polyphosphate builders are employed. Yet the present builder systems do not contribute to the eutrophication problems characteristic of phosphorus-containing builders.

Accordingly, this invention provides a washing composition composed of an organic detergent surfactant suitable for use in water and, as a builder, either $\alpha,\alpha'$-carboxyalkoxy succinic acids wherein the carboxyalkoxy radicals contain from 2 to about 7 carbon atoms, water-soluble salt of such acids, or mixtures of the before mentioned acids and salts. Although the proportions may be varied to suit the needs of the occasion, the weight ratio of the detergent surfactant to the builder of this invention will normally fall within the range of about 10:1 to about 1:10. A preferred range is from about 1:1 to about 1:6. The weight ratio of detergent surfactant to builder will of course be on the low side of the before mentioned range whenever utilizing a builder of high molecular weight and vice versa.

The builder of this invention may be added to the system as a salt or an acid or a mixture thereof. When it is desired to operate a system having a high pH (about 9–10) the salts may be added as they render the solution basic. On the other hand, when operating under acidic conditions the acidic form of the builder is added to the washing composition. Of course when it is desired to operate within an intermediate range (pH of about 7) the acid and the salt may be both utilized. Another mode of addition involves merely adding the acid or the salt and subsequently adjusting the pH of the system by adding base or acid respectively. For example, a system having a high pH can be obtained by adding the acid form of the builder and then neutralizing the system with a base.

It has been found that the best building action takes place at high pH, i.e. of about 10. However, it has been found that the particular builders of this invention are still very effective in essentially neutral systems.

As noted above, the builders of this invention can be used with a wide variety of detergents including those classed in the art as anionic detergents, cationic detergents, nonionic detergents, ampholytic (i.e., amphoteric) detergents, and zwitterionic detergents, and any suitable mixture of two or more of these (whether from the same class or from different classes). The anionic surface-active compounds are generally described as compounds which contain hydrophilic and lyophilic groups in their molecular structure and which ionize in an aqueous medium to give anions containing the lyophilic group. Typical of these compounds are the alkali metal salts of organic sulfonates or sulfates, such as the alkali metal alkyl aryl sulfonates and the alkali metal salts of sulfates of straight chain primary alcohols. Sodium dodecylbenzene sulfonate and sodium lauryl sulfate are typical examples of these anionic surface-active compounds (anionic synthetic detergents). For a further amplification of anionic organic detergents which can be successfully built in accordance with this invention, reference should be had to U.S. Pat. No. 3,422,021, particularly the passage extending from Column 11, line 47 through Column 12, line 15, including the references therein cited, which passage is incorporated herein as if fully set out in this specification.

The cationic detergents are those which ionize in an aqueous medium to give cations containing the lyophilic group. Typical of these compounds are the quaternary ammonium salts which contain an alkyl group of about 12 to about 18 carbon atoms, such as lauryl benzyl dimethyl ammonium chloride. Compounds of this nature are used in detergent formulations for special purposes; e.g., sanitizing and fabric softening.

Nonionic surface-active compounds are generally described as compounds which do not ionize in water solution. Often times these possess hydrophilic characteristics by virtue of the presence therein of an oxygenated chain (e.g., a polyoxyethylene chain), the lyophilic portion of the molecule being derived from fatty acids, phenols, alcohols, amides or amines. Exemplary materials are the poly-(ethylene oxide) condensates of alkyl phenols (e.g., the condensation product formed from one mole of nonyl phenol and ten moles of ethylene oxide), and the condensation products of aliphatic alcohols and ethylene oxide (e.g., the condensation product formed from 1 1 mole of tridecanol and 12 moles of ethylene oxide). Reference should be had to U.S. Pat. No. 3,422,021, especially the passage extending from Column 12, line 16 through Column 13, line 26 where a fairly extensive discussion and exemplification of non-ionic synthetic detergents is set forth. Inasmuch as the nonionic synthetic detergents set forth in that passage can be successfully built in accordance with this invention, the foregoing passage is incorporated herein as if fully set out in this specification.

The ampholytic surfactants are compounds having both anionic and cationic groups in the same molecule. Exemplary of such materials are derivatives of aliphatic amines which contain a long chain of about 8 to about 18 carbon atoms and an anionic water solubilizing group, e.g., carboxysulfo, sulfo or sulfato. Examples of ampholytic detergents are sodium-3-dodecylaminopropionate, sodium-3-dodecylaminopropane sulfonate, sodium N-methyl taurate, and related substances such as higher alkyl disubstituted amino acids, betaines, thetines, sulfated long chain olefinic amines, and sulfated imidazoline derivatives.

Zwitterionic synthetic detergents are generally regarded as derivatives of aliphatic quaternary ammonium compounds, in which the aliphatic radical may be straight chain or branched and wherein one of the aliphatic substituents contains from about 8 to 18 carbon atoms and one contains an anionic water solubilizing group, e.g., carboxy, sulfo, or sulfato. Examples of compounds falling within this definition are 3-(N,N-dimethyl-N-hexadecyl ammonio)-propane-1-sulfonate and 3-(N,N-dimethyl-N-hexadecyl ammonio)-2-hydroxypropane-1-sulfonate. For a still further appreciation of surface-active compounds (synthetic detergents) which can be employed in the practice of this invention reference may be had, for example, to the disclosures of U.S. Pat. No. 2,961,409 and French Pat. No. 1,398,753.

For a very extensive disclosure of surfactants in general see U.S. Pat. No. 3,526,592 and the various U.S. patents referred to therein. Inasmuch as the surfactants set forth in these above patents are compatible with the builders of this disclosure, the foregoing patents are incorporated herein as if fully set out in the specification.

Finished detergent formulations of this invention may contain minor amounts of other commonly used materials in order to enhance the effectiveness or attractiveness of the product. Exemplary of such materials are soluble sodium carboxymethyl cellulose or other soil redeposition inhibitors; perfume; fluorescers; dyes or pigments; brightening agents; enzymes; water; alcohols; other builder additives, such as the water-soluble salts of ethylenediaminetetraacetic acid, N-(2-hydroxyethyl)-ethylenediaminetriacetic acid, nitrilotriacetic acid and N-(2-hydroxyethyl)-nitrilodiacetic acid; and pH adjusters, such as sodium hydroxide and potassium hydroxide. In the built liquid detergent formulations of this invention, the use of hydrotropic agents may be found efficacious. Suitable hydrotropes include the water-soluble alkali metal salts of toluene sulfonic acid, benzene sulfonic acid, and xylene sulfonic acid. Potassium toluene sulfonate and sodium toluene sulfonate are preferred for this use and will normally be employed in concentrations ranging from about 2 to 10 percent by weight based on the total composition.

It will be apparent from the foregoing that the compositions of this invention may be formulated according to any of the various commercially desirable forms. For example, the formulations of this invention may be provided in granular form, in liquid form, in tablet form or in the form of flakes or powders.

The relative proportions and absolute quantities of the several ingredients of the finished compositions of this invention are susceptible to variation and in most cases will vary depending upon such factors as the nature of the particular ingredients being utilized, the end use for which the composition is intended to be put, the relative costs of the ingredients, and the like. For example, the total concentration of the detergent formulations of this invention in water will normally range below about 0.15 percent by weight although it is entirely feasible to utilize higher concentrations where the circumstances warrant or justify the use of higher concentrations. In most cases the aqueous washing solutions of this invention will contain from about 0.1 to about 0.2 weight percent combined detergent active(s) and builder. The preferred compositions of this invention are phosphorus-free although it may be desired to include therein reduced quantities of conventional phosphorus-containing materials such as sodium tripolyphosphate, tetrasodium pyrophosphate, salts of substituted methylene diphosphonic containing materials such as sodium tripolyphosphate, tetrasodium pyrophosphate, salts of substituted methylene diphosphonic acids, long chain tertiary phosphine oxides, or the like.

The invention is not to be limited to any particular method of mixing the builder and the detergent. The builder may be mechanically mixed in, crutched in the detergent in the form of a slurry, or dissolved in a solution of the detergent. In addition, the builder system may be admixed with the detergent in any of the forms in which the detergent is manufactured, as well as being added simultaneously or separated to an aqueous solution. In any event, the present builder system is intended to be used with the detergent at the time of application as a cleansing agent.

A further embodiment of this invention encompasses the use of either $\alpha,\alpha'$-carboxyalkoxy succinic acids wherein the carboxyalkoxy radicals contain from 2 to about 7 carbon atoms, the water soluble salts thereof or mixture of the salt and acid as sequestering agents. The preferred salts are the alkali metal salts. Of these salts sodium and potassium are most preferred. Other useful salts are the ammonium salts, the alkylammonium salts, the alkanol ammonium salts, and the like.

The concentration of the above mentioned acids and salts in any given solution will of course be dependent to some extent upon the concentration of the substance to be sequestered. Thus amounts ranging from trace quantities up to about 500 ppm or more are permissible.

In general, the amount of sequestrant used is an amount sufficient to chelate to a desired extent with whatever is in the water to be chelated. Thus the amount of sequestrant in aqueous solution generally ranges from a trace up to a saturation amount. Preferably, the amount of sequestrant ranges from about 10 parts per billion up to about 50,000 parts per million. The higher amounts are generally used in treatment of industrial waste streams and the like. For water treatment where the amount of material to be chelated is generally smaller than with industrial wastes the amount of sequestrant ranges from about 10 parts per million to about 500 parts per million. An even more preferred narrower range is from about 50 to about 200 parts per million, with the nation-wide average of 120 parts per million being typical and frequently preferred.

A unique feature exhibited by the above described sequestrants of this invention is that they are effective sequestrants in systems having a pH range of from about 3 to about 10.

A typical example of a system in which such sequestrants are very valuable is an aqueous detergent solution. In such solutions, a wide variety of detergents or surfactants, including anionic, cationic, nonionic, ampholytic, and zwitterionic detergents, as well as many suitable mixtures of such detergents may be used in conjunction with the sequestrants of this invention. The prior description of these detergents and surfactants found in this specification in conjunction with the builder action of the compounds of this invention is likewise applicable to the sequestering function of these compounds.

In washing systems the weight ratio of surfactant to sequestrant ranges from about 10:1 to about 1:10. Preferred ratios are within the range of from about 1:1 to about 1:6.

A preferred embodiment in this invention is the sequestration of calcium and magnesium ions in an aqueous medium. However, various other metal ions may also be sequestered. Sequesterable metal ions in general include the polyvalent metals of Groups I-B, II-A, II-B, III-A, III-B, IV-A, IV-B, V-A, V-B, VI-A, VI-B, VII-B, and VIII of the Periodic Chart (Fisher Scientific Co., 1955). For example, iron, copper, aluminum, chromium, nickel, manganese, cobalt, tin, and vanadium may also be sequestered pursuant to this invention. Preferably the sequestered substance is calcium or magnesium. Solvents may be present in the aqueous solution of sequestrant, preferred solvents being polar solvents such as lower alcohols, ketones and carboxylic acids. Thus, typical co-solvents are ethyl alcohol, acetone and acetic acid.

In some applications and uses of the compositions of the present invention, it is desirable to have $\alpha,\alpha'$-carboxyalkoxy succinic acid compounds in which each of the carboxyalkoxy groups has more than 7 carbon atoms, such as from about 8 to about 30 carbon atoms. In general, these compounds can be prepared by processes similar to those used for producing the compounds whose carboxyalkoxy groups each contain from 2 to about 7 carbon atoms, attention being given to the use of an appropriate starting material to contribute the desired carboxylalkoxy group.

Typical compounds of this group include the following acids: $\alpha,\alpha'$-(carboxyoctoxy) succinic acid, $\alpha,\alpha'$-(carboxydecoxy) succinic acid, $\alpha,\alpha'$-(carboxydodecoxy) succinic acid, $\alpha,\alpha'$-(carboxytetradecoxy) succinic acid, $\alpha,\alpha'$-(carboxyhexadecoxy) succinic acid, $\alpha,\alpha'$-(carboxyoctadecoxy) succinic acid, $\alpha,\alpha'$-(carboxyeicosoxy) succinic acid, $\alpha,\alpha'$-(carboxypentacosoxy) succinic acid, and $\alpha,\alpha'$-(carboxytriacontoxy) succinic acid. Useful salts of these acids include those having cations set forth hereinbefore for the acids and the salts having from 2 to about 7 carbon atoms per carboxyalkoxy group.

In order to still further illustrate the practice of this invention, the following examples are presented.

EXAMPLE I

A preferred built formulation of this invention had the following composition:

| | Weight Percent |
|---|---|
| Dodecylbenzene sulfonate (a typical linear alkyl benzene sulfonate) | 20.0 |
| Sodium silicate (ratio $SiO_2:Na_2O$ of 2.4:1) | 6.0 |
| Sodium carboxymethyl cellulose | 0.6 |
| Sodium sulfate | 33.4 |
| $\alpha,\alpha'$-carboxymethoxy succinic acid | 40.0 |
| | 100.0 |

The performance of this detergent composition was evaluated by use of the standard Launder-Ometer test. In particular, the formulation was dissolved in water to a concentration of 0.15 weight percent and the pH of the solution adjusted to 9.5 with small amounts of sodium hydroxide solution. The water had a hardness of 150 ppm (Ca/Mg 3/2). Swatches of standard artificially soiled cloth were subjected to the washing procedure. The Launder-Ometer bath temperature was fixed at 120° F. and the washing span was 10 minutes. After washing, the samples were removed from the washing solution and thoroughly rinsed with pure water. After drying, the whiteness of the cloths was ascertained by use of a standard commercially available reflectance photometer. The identical procedure also was employed with a formulation identical to that described above with the exception that sodium tripolyphosphate was used in lieu of the $\alpha,\alpha'$-carboxymethoxy succinic acid.

In these tests it was established that the formulation of this invention was essentially as effective as the corresponding sodium tripolyphosphate formulation. In particular, the cloths washed with the formulation of this invention had a whiteness of 95 ± 6 compared to the whiteness of the same kind of soiled cloths washed in the sodium tripolyphosphate formulation (assigned the value of 100 percent).

EXAMPLE II

The same procedure was followed as in Example I except that water having a hardness of 300 ppm (Ca/Mg 3/2) was used. It was found that $\alpha,\alpha'$-carboxymethoxy succinic acid gave a whiteness of 94 percent ± 6 as compared to the assigned value of a 100 percent for sodium tripolyphosphate.

EXAMPLE III

Seven grains of calcium (calculated as calcium carbonate) were added to a gallon of water. To this solution $\alpha,\alpha'$-carboxymethoxy succinic acid was added so as to prepare a percent solution of the acid. The pH was adjusted to 10 by the addition of sodium hydroxide. The residual calcium was then measured using a standardized calcium electrode. A reduction of 0.7 grains per gallon of calcium was noted indicating that 6.3 grains per gallon had been sequestered.

EXAMPLE IV

The same procedure was followed as in Example III except that the pH was adjusted to 7. Upon measurement of the remaining calcium it was found that 1.6 grains of calcium per gallon remained thus indicating that 5.4 grains of calcium per gallon were sequestered.

Generally speaking, the builders and sequestrants of this invention can be made by the reaction of an $\alpha$-diazo ester containing up to 7 carbon atoms in the carboxyl structure and a tartrate ester followed by the saponification of the resultant product. Similarly, the $\alpha,\alpha'$-carboxyalkoxy succinic acid structure useful as lubricant additives, sizing agents, etc. containing from 8 to 30 carbon atoms per carboxyalkoxy group are prepared using the appropriate $\alpha$-diazo ester, such as ethyl diazooctylate plus a tartrate ester. More particularly, to a 25 percent solution tartrate ester (1 mole) and diethyl ether, 5 weight percent (based on the weight of the ester) of freshly distilled $BF_3$-etherate is added. The solution is cooled from room temperature to about 5° C. After cooling about 1 mole of the $\alpha$-diazo ester is added to the solution. The solution is stirred until $N_2$ evolution has substantially ceased and then is allowed to come to room temperature. The unreacted reactants are separated from the product by washing the solution with a 5 percent $NaHCO_3$ solution followed by drying and distillation. Saponification of the recovered $\alpha,\alpha'$-carboxyalkoxy succinic acid tetraalkyl ester with a calculated amount of caustic, i.e., aqueous NaOH, yields a salt of $\alpha,\alpha'$-carboxyalkoxy succinic acid. The exact composition of the carboxyalkoxy radical found in the salt will of course depend upon the particular reactants used. For example, if a carboxymethoxy radical is desired then the tartrate ester should be diethyl tartrate and the α-diazo ester should be ethyl diazoacetate. To obtain the acid forms the builder and sequestrants of this invention the above salts are merely neutralized with a mineral acid such as HCl, $H_2SO_4$, etc.

As noted above, the builders and sequestrants of this invention may be used in combination with other builders or sequestrants. Such combinations offer the opportunity for enhanced cost effectiveness or superior results, or both. Among the builders or sequestrants which may be combined with those of this invention are the water soluble salts of such acids as citric acid (e.g., trisodium citrate, tripotassium citrate, etc.), diglycolic acid (e.g., disodium diglycolate, dipotassium diglycolate, etc.), nitrilotriacetic acid (e.g., trisodium nitrilotriacetate, tripotassium nitrilotriacetate, etc.), oxydisuccinic acid (e.g., tetrasodium oxydisuccinate, tetrapotassium oxydisuccinate, etc.), and the like, as well as mixtures of two or more of such salts. If desired, the free acids (e.g., citric acid, diglycolic acid, nitrilotriacetic acid, oxydisuccinic acid, or mixtures of two or more of these acids) may be used in combination with the builders or sequestrants of this invention. Combinations in which there is no nitrogen or phosphorus containing ingredient are particularly preferred from the ecological standpoint. When using such combinations the ratios of the builders or sequestrants may be varied within relatively wide limits although generally speaking the weight ratio between the builder of this invention and the builder used therewith will fall within the range of from about 0.1:1 to about 10:1, and most preferably from about 0.25:1 to about 4:1.

What is claimed is:

1. The method of sequestering sequesterable metal ions in an aqueous solution which comprises introducing into said solution a sequestrant composition selected from the group consisting of:
   (a) α,α'-carboxyalkoxy succinic acid, wherein the carboxyalkoxy radicals contain from 2 to about 7 carbon atoms,
   (b) water soluble salts of said acids; and
   (c) mixtures of (a) and (b),
and a surfactant selected from the group consisting of anionic detergents, cationic detergents, nonionic detergents, ampholytic detergents, zwitterionic detergents and mixtures thereof, the ratio by weight of the surfactant to the sequestrant being from about 10:1 to about 1:10.

2. The method of claim 1, wherein the sequesterable metal ion is calcium or magnesium.

3. The method of claim 1, wherein the carboxyalkoxy radicals contain 2 carbon atoms.

4. The method of claim 1, wherein the water soluble salts are alkali metal salts, alkaline earth metal salts, ammonium salts or alkyl ammonium salts.

5. The method of claim 1, wherein the water soluble salts are sodium or potassium salts.

6. The method of claim 1, wherein the water soluble salt is a sodium salt of α,α'-carboxymethoxy succinic acid.

7. The method of claim 1, wherein the water soluble salt is a potassium salt of α,α'-carboxymethoxy succinic acid.

8. The method of claim 1, wherein the sequestrant composition is α,α'-carboxymethoxy succinic acid, tetra sodium salt or α,α'-carboxymethoxy succinic acid, tetra potassium salt and a surfactant.

9. The method of claim 1, wherein the sequestrant composition is α,α'-carboxymethoxy succinic acid and a surfactant.

* * * * *